United States Patent [19]
Lai

[11] Patent Number: 5,864,980
[45] Date of Patent: Feb. 2, 1999

[54] FISHING ROD

[76] Inventor: Sai Cheong Lai, Flat 1305, 13th Floor, Block F, Hing On House, Sui Wo Court, Shatin, New Territories, Hong Kong

[21] Appl. No.: 15,225

[22] Filed: Jan. 29, 1998

[51] Int. Cl.[6] .................................................. A01K 87/02
[52] U.S. Cl. ............................................................. 43/18.1
[58] Field of Search .................................. 43/20, 18.1, 23

[56] References Cited

U.S. PATENT DOCUMENTS 4,768,303 9/1988 Baylink ...................................... 43/18.1
5,444,934 8/1995 La Touche ................................ 43/18.1

Primary Examiner—Thomas Price
Attorney, Agent, or Firm—Leydig, Voit & Mayer

[57] ABSTRACT

A fishing rod comprising a telescopically extendable rod body, a elongate handle, and a linkage formed by at least one elongate link connecting the handle to the rod body. The linkage has two ends which are pivotably connected to the handle and the rod body, respectively, such that the handle is movable between a first position extending from the rod body and a second position lying close to and side-by-side with the rod body in the same direction.

12 Claims, 4 Drawing Sheets

FISHING ROD

The present invention relates to a fishing rod which can be shortened.

SUMMARY OF THE INVENTION

According to the invention, there is provided a fishing rod comprising a telescopically extendable rod body, a elongate handle, and a linkage formed by at least one elongate link connecting the handle to the rod body, said linkage having two ends which are pivotably connected to the handle and the rod body, respectively, such that the handle is movable between a first position extending from the rod body and a second position lying close to and side-by-side with the rod body in the same direction.

Preferably, the linkage is formed by two said links which are spaced apart for maintaining the angle of the handle relative to the rod body.

More preferably, the linkage is formed by three said links which together form a triangular arrangement for providing a strong and stable connection.

It is preferred that a lock is provided to lock the handle to the rod body in the second position.

More preferably, the lock is formed by a first part provided at one of the rod body and handle and a second part provided at the link for engagement with the first part.

On the one hand, it is preferred that the first part of the lock is provided at a rear end of the rod body.

More preferably, the first part of the lock is spring loaded.

Further more preferably, the first part of the lock is in the form of a projection.

On the other hand, it is preferred that the second part of the lock is provided at the link at a position adjacent to the handle.

More preferably, the second part of the lock is in the form of a hook.

In a preferred embodiment, the length of the handle and its position relative to the rod body are determined such that in the second condition the handle extends rearwards to a position substantially the same as that of the rod body.

The invention also provides a fishing rod comprising a telescopically extendable rod body, a elongate handle, and a link connecting the handle to the rod body, said link being pivotable through an angle of substantially 180° for the handle to be moved between a first position extending from the rod body and a second position lying close to and side-by-side with the rod body.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
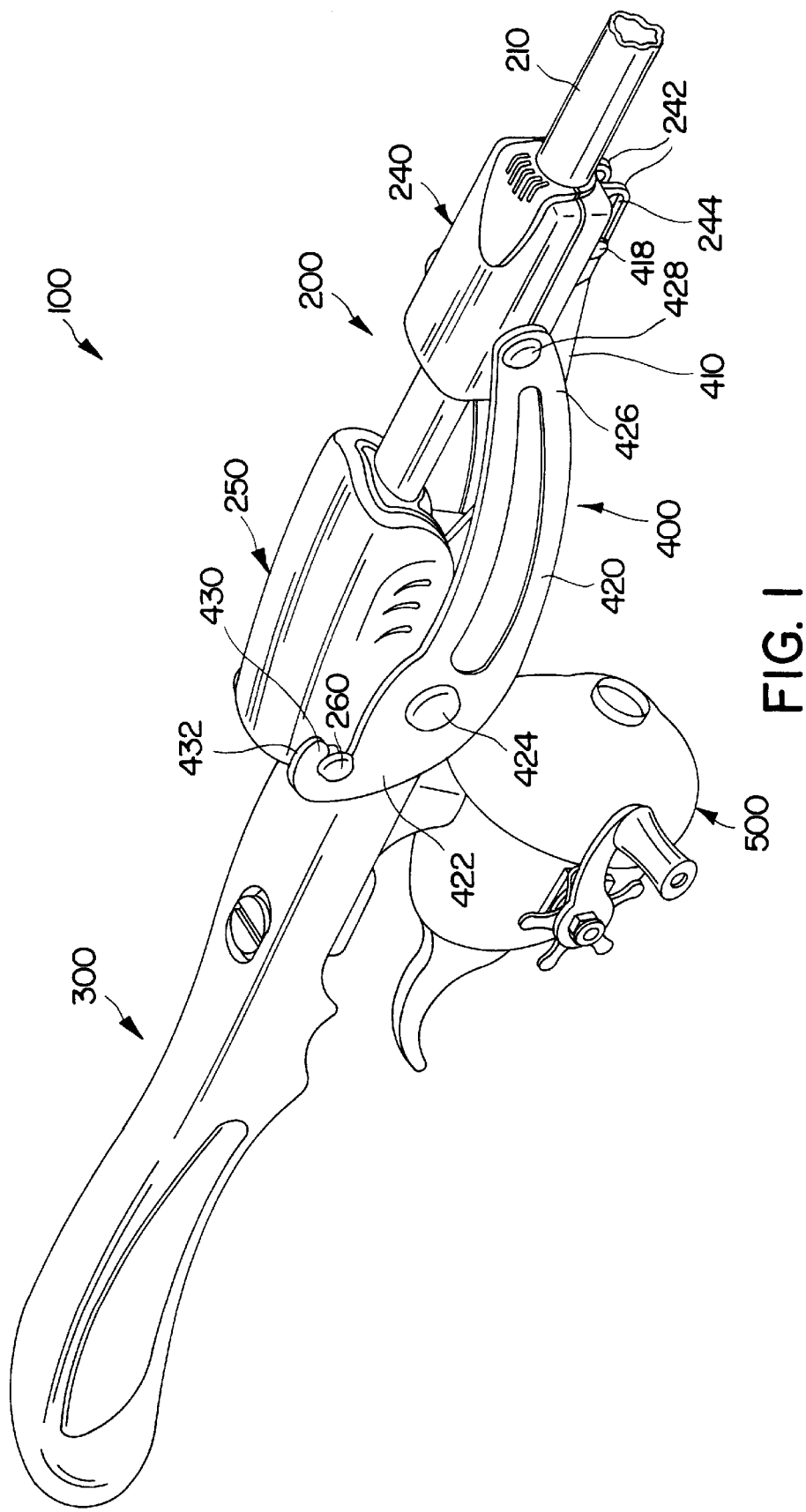
FIG. 1 is a perspective view of an embodiment of a fishing rod in accordance with the invention, which has a rod body and a handle shown in a first position extending from the rod body.

Referring to the drawings, there is shown a fishing rod 100 embodying the invention, which comprises a rod body 200, a stick handle 300 and a reel 500 attached below the handle 300. The handle 300 is shaped for easy gripping and has a slit front end 310. The rod body 200 is formed by a hollow shaft 210 and a series of six telescopically extendable sections 220. The sections 220 are extendable forwards from inside the shaft 210 and are alternately fitted with rings 230 for guiding a fishing line. The shaft 210 is provided, at mid-length, with a support 240 for connection to the handle 300. The support 240 has a pair of parallel bottom fins 242, each having a short slot 244. The shaft 210 includes a spring loaded rearmost end piece 250.

Figure 4:
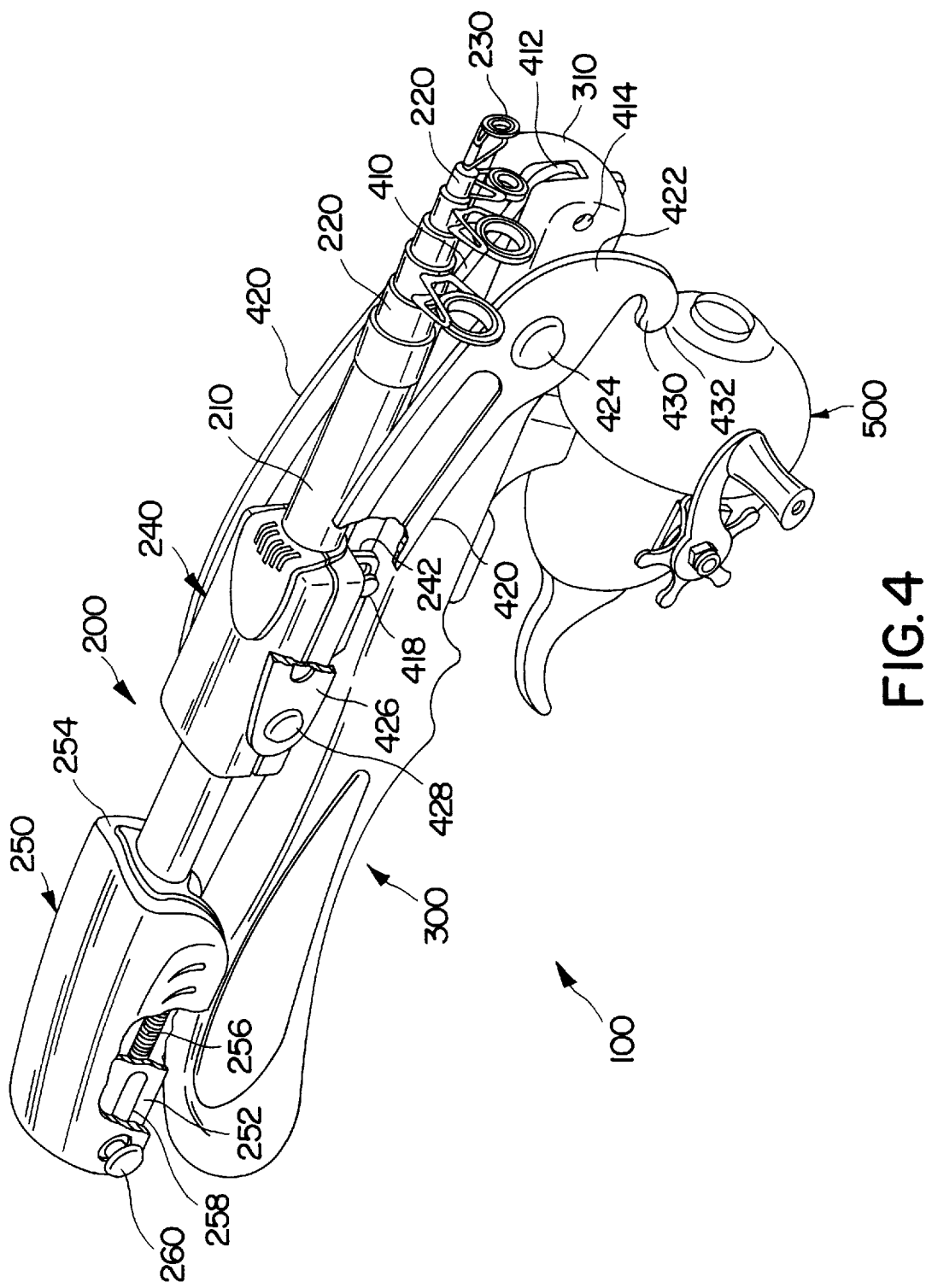
FIG. 4 is a perspective view of the fishing rod of FIG. 1, showing the handle in a second position lying close to and side-by-side with rod body.

As only shown in FIG. 4, the end piece 250 is formed by an oblong base 252 and an oblong cover 254 embracing the base 252. The base 252 is mounted fast on the shaft 210, and the cover 254 is slidable on the base 252. An internal spring 256 is provided for resiliently biassing the cover 254 to slide rearwards relative to the base 252. The cover 254 is fitted with a pair of aligned studs 260 on opposite sides, which engage internally with respective side grooves 258 on the base 252 for limiting the movement of the cover 254. The studs 260 project out from opposite sides of the cover 254.

A linkage 400 is used to movably connect the handle 300 to the rod body 200, which is formed by a central link 410 and two opposite side links 420, all being flat and strip-like. Lower end 412 of the central link 410 is hinged, by means of a fixed pin 414, through the slit front end 310 of the handle 300. Upper end 416 of the central link 410 is hinged, by means of a sliding pin 418, between the bottom fins 242 of the support 240 on the rod body shaft 210. This pin 418 extends through the slots 244 of the fins 242 and is slidable transversely therealong. The side links 420 have respective lower ends 422 which are hinged to opposite sides of the handle front end 310 by means of a fixed pin 424. Upper ends 426 of the side links 420 are hinged to opposite sides of the rod body support 240 by means of another fixed pin 428.

The two side links 420 are positioned at a certain distance behind the central link 410, which together form a triangular arrangement for providing a strong and stable connection. Although the side links 420 are slightly longer than the central link 410, the overall linkage 400 is intended to maintain the handle 300 at generally the same angle or substantially parallel to the rod body 200.

The lower end 422 of each side link 420 is formed into a hook 430 which turns back for an angle of about 180° and has a curved outer edge 432. The hooks 430 are provided on the same side of the side links 420 as the end piece 250 of the rod body 200. The studs 260 of the end piece 250 and the hooks 430 are positioned at generally equal distance from the hinge pin 428, for inter-engagement as described below.

Figure 2:
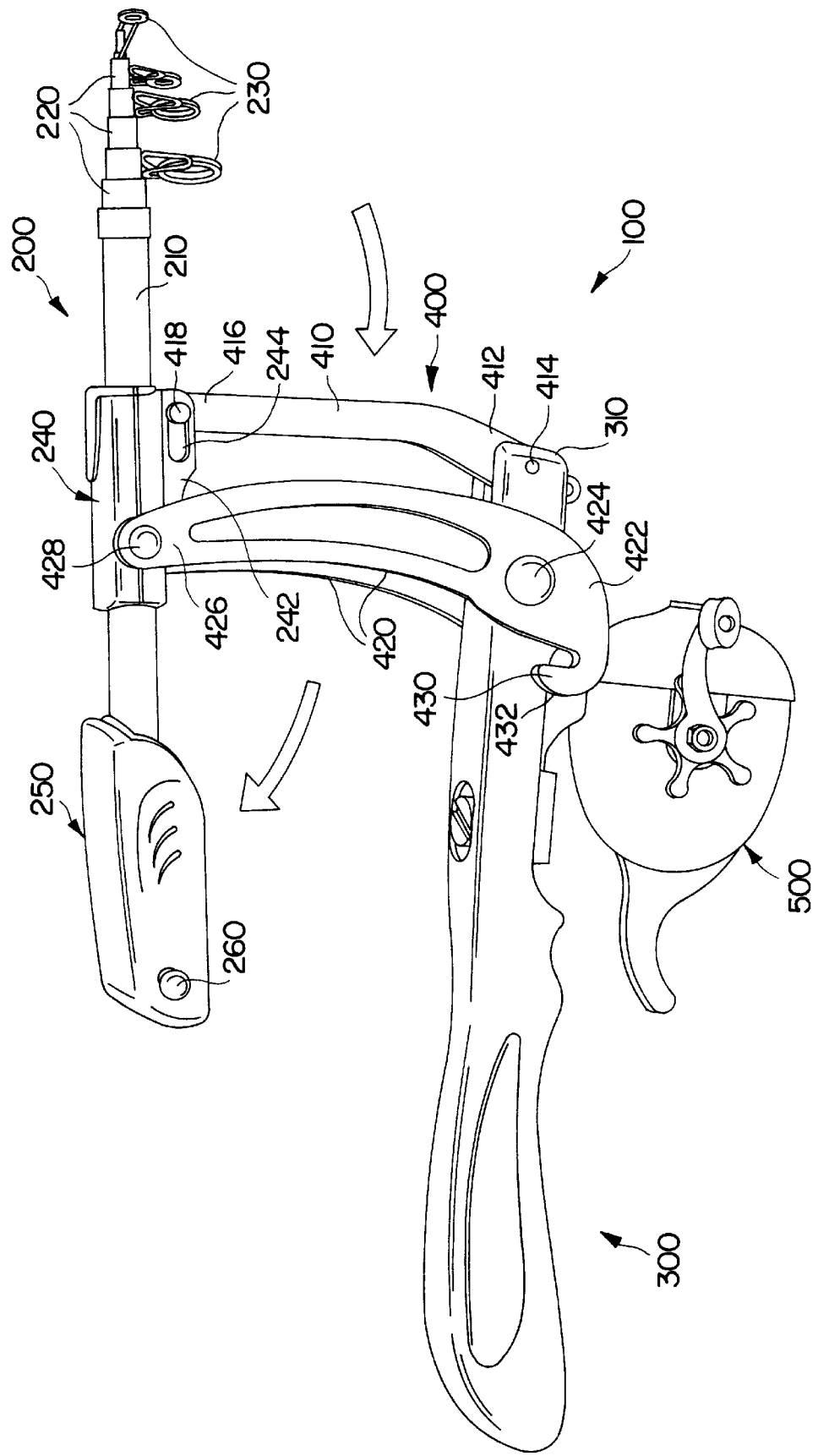
FIG. 2 is a side view of the fishing rod of FIG. 1, showing the handle moved away from the first position.
Figure 3:
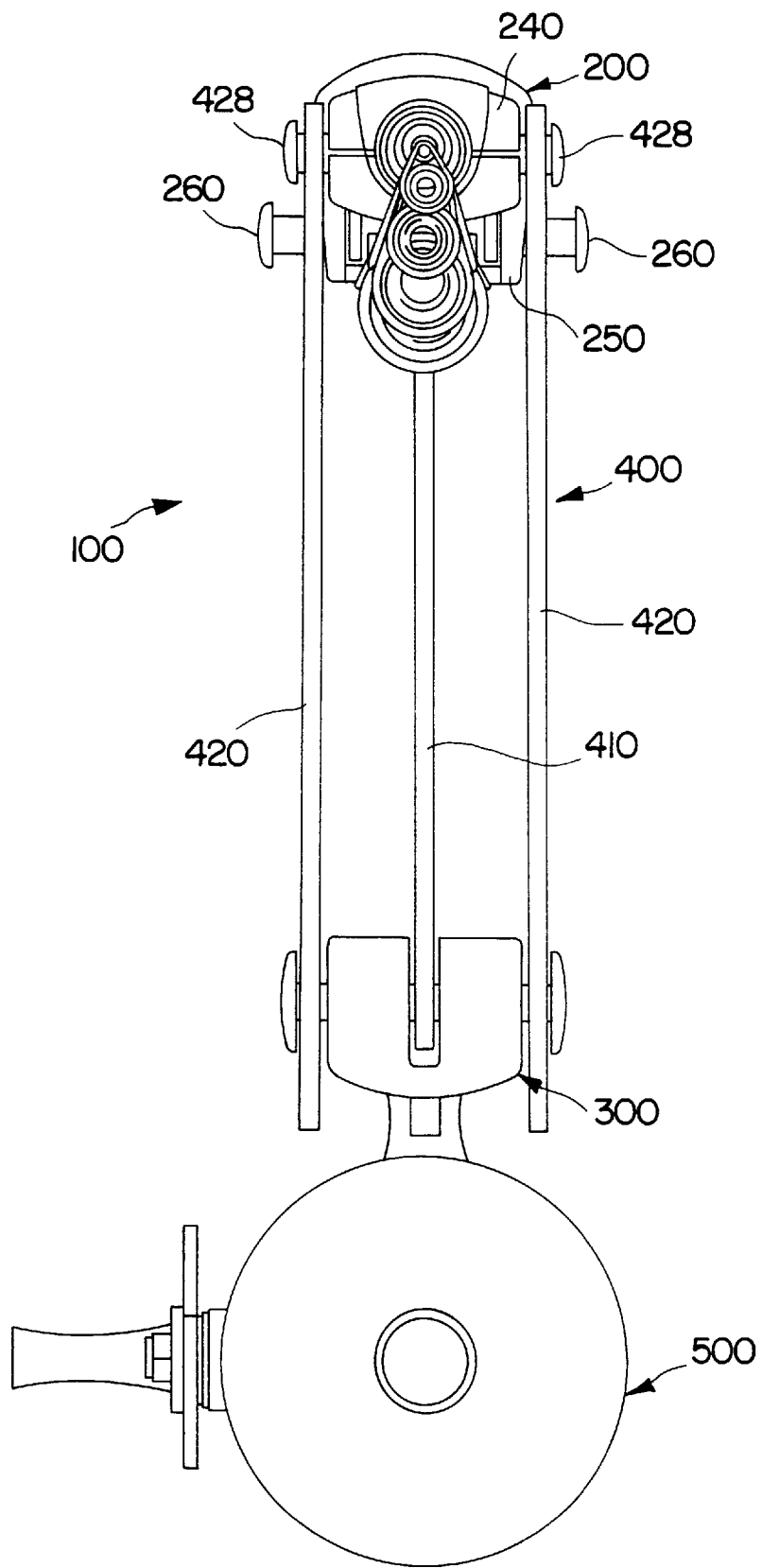
FIG. 3 is a front end view of the fishing rod of FIG. 2.

The linkage 400 renders the handle 300 movable to lie close to and side-by-side with the rod body 200 for convenient carrying or easy storage of the overall fishing rod 100 (FIG. 4) or to extend in the same direction from the rod body 200 for use (FIG. 1), through a Z-like double-hinging action (FIG. 2). Moving of the handle 300 off the rod body 200 (from FIG. 4 to FIG. 1) causes the side links 420 (and also the central link 410) to pivot downwards and then rearwards through an angle of about 180°. When the side links 420 are about to lie flat again, the curved edges 432 of their end hooks 430 will hit the studs 260 of the end piece 250. As a result, the end piece cover 254 will be momentarily slid backwards (against the action of the spring 256), thereby allowing the studs 260 to be engaged by the corresponding hooks 430 (FIG. 1) through a snapping action. Thus, the fishing rod 100 is locked in a fully extended condition for use.

By reason of the turning angle of the hooks 430, the studs 260 can only be released from hooks 430 by manually sliding the cover 254 momentarily backwards, whereupon the handle 300 may be folded back to lie against the rod body 200 (FIG. 4) for carrying or storage. The length of the handle 300 and its position relative to the rod body 200 are determined such that in the storage condition the rearmost end of the handle 300 does not extend beyond that of the rod body 200 for maximum reduction of the overall length. In this particular embodiment, the handle 300 extends rearwards to a position substantially the same as that of the rod body 200, as shown in FIG. 4.

It is envisaged that means may be provided for locking the handle 300 and the rod body 200 close together, such as a latch or magnetic holder provided between the upper side of the handle 300 and the lower side of the rod body end piece 250.

The invention has been described by way of example only, and various other modifications and/or alterations to the described embodiment may be made by persons skilled in the art without departing from the scope of the invention as specified in the appended claims.

What is claimed is:

1. A fishing rod comprising a telescopically extendable rod body, a elongate handle, and a linkage formed by at least one elongate link connecting the handle to the rod body, said linkage having two ends which are pivotably connected to the handle and the rod body, respectively, such that the handle is movable between a first position extending from the rod body and a second position lying close to and side-by-side with the rod body in the same direction.

2. A fishing rod as claimed in claim 1, wherein the linkage is formed by two links which are spaced apart for maintaining the angle of the handle relative to the rod body.

3. A fishing rod as claimed in claim 2, wherein the linkage is formed by three links which together form a triangular arrangement for providing a strong and stable connection.

4. A fishing rod as claimed in claim 1, wherein a lock is provided to lock the handle to the rod body in the second position.

5. A fishing rod as claimed in claim 4, wherein the lock is formed by a first part provided at one of the rod body and handle and a second part provided at the link for engagement with the first part.

6. A fishing rod as claimed in claim 5, wherein the first part of the lock is provided at a rear end of the rod body.

7. A fishing rod as claimed in claim 6, wherein the first part of the lock is spring loaded.

8. A fishing rod as claimed in claim 7, wherein the first part of the lock is in the form of a projection.

9. A fishing rod as claimed in claim 5, wherein the second part of the lock is provided at the link at a position adjacent to the handle.

10. A fishing rod as claimed in claim 9, wherein the second part of the lock is in the form of a hook.

11. A fishing rod as claimed in claim 1, wherein the length of the handle and its position relative to the rod body are determined such that in the second condition the handle extends rearwards to a position substantially the same as that of the rod body.

12. A fishing rod comprising a telescopically extendable rod body, a elongate handle, and a link connecting the handle to the rod body, said link being pivotable through an angle of substantially 180° for the handle to be moved between a first position extending from the rod body and a second position lying close to and side-by-side with the rod body.

* * * * *

UNITED STATES PATENT AND TRADEMARK OFFICE
CERTIFICATE OF CORRECTION

PATENT NO. : 5,864,980
DATED : February 2, 1999
INVENTOR(S) : SAI CHEONG LAI

It is certified that error appears in the above-identified patent and that said Letters Patent is hereby corrected as shown below:

Column 4, line 5, change "second" to --first--.

Signed and Sealed this

Twenty-fourth Day of August, 1999

Attest:

Q. TODD DICKINSON

*Attesting Officer*     *Acting Commissioner of Patents and Trademarks*